(12) United States Patent  (10) Patent No.: US 8,223,231 B2
Tanizoe  (45) Date of Patent: Jul. 17, 2012

(54) IMAGING APPARATUS AND IMAGE PROCESSING PROGRAM

(75) Inventor: Yukihiro Tanizoe, Osaka (JP)

(73) Assignee: Panasonic Corporation, Osaka (JP)

( * ) Notice: Subject to any disclaimer, the term of this patent is extended or adjusted under 35 U.S.C. 154(b) by 416 days.

(21) Appl. No.: 12/543,903

(22) Filed: Aug. 19, 2009

(65) Prior Publication Data

US 2010/0045831 A1 Feb. 25, 2010

(30) Foreign Application Priority Data

Aug. 21, 2008 (JP) ................................. 2008-212633

(51) Int. Cl.
H04N 5/335 (2006.01)
(52) U.S. Cl. .................................... 348/272; 348/222.1
(58) Field of Classification Search ............... 348/222.1, 348/272, 273, 280, 281; 382/162, 167, 275
See application file for complete search history.

(56) References Cited

U.S. PATENT DOCUMENTS 7,847,829 B2 * 12/2010 Mitsunaga et al. ........ 348/222.1
2002/0140833 A1 10/2002 Hirai
2003/0160875 A1 * 8/2003 Mitsunaga et al. ........ 348/222.1
2003/0197793 A1 * 10/2003 Mitsunaga et al. ........ 348/222.1
2003/0231807 A1 12/2003 Ozawa

FOREIGN PATENT DOCUMENTS

| EP | 1229743 A2 | 8/2002 |
| JP | 2002-315012 A | 10/2002 |
| JP | 2004-23384 A | 1/2004 |
| JP | 2004-282366 A | 10/2004 |
| JP | 3862506 B | 10/2006 |

* cited by examiner

Primary Examiner — Tuan Ho
(74) Attorney, Agent, or Firm — Panasonic Patent Center; Dhiren Odedra; Kerry Culpepper

(57) ABSTRACT

There is provided an imaging apparatus capable of creating RAW data subsequent to predetermined processing including distortion correction and reduction/enlargement processing of an image. The imaging apparatus includes an imaging device operable to create image data in a first color arrangement pattern (for example, Bayer array) by converting an optical signal to an electrical signal; a color arrangement conversion unit operable to convert a color arrangement pattern of the image data from the first color arrangement pattern to a second color arrangement pattern; an image processing unit operable to perform predetermined processing (enlargement, distortion correction and the like) on the image data converted by the color arrangement conversion unit; and a color arrangement reverse-conversion unit operable to convert reversely the color arrangement pattern of the image data processed by the image processing unit from the second color arrangement pattern back to the first color arrangement pattern.

20 Claims, 8 Drawing Sheets

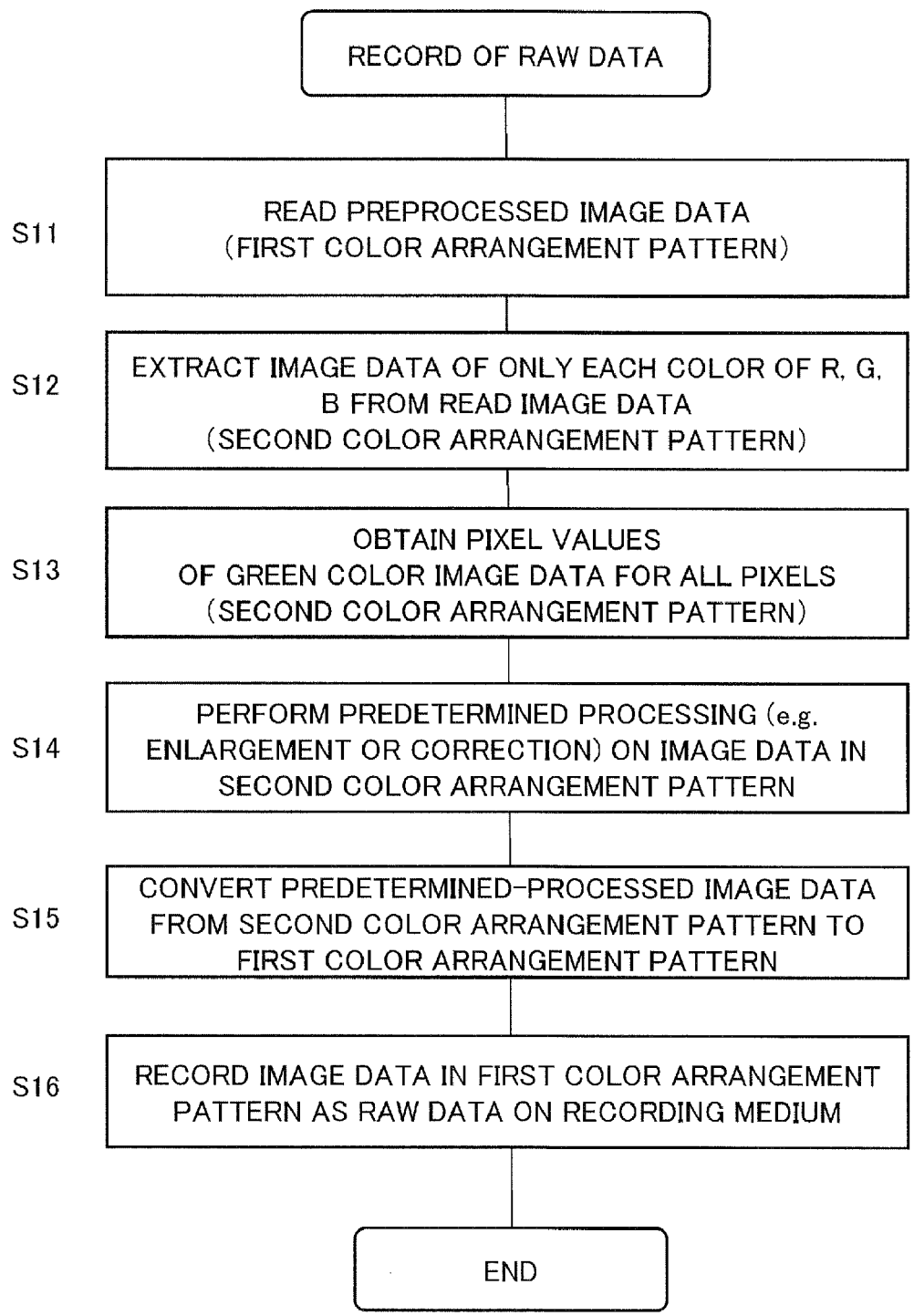

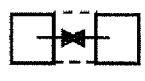
Fig. 5A — INTERPOLATION IN VERTICAL DIRECTION WHEN SUBJECT IS VERTICAL LINE
Fig. 5B — INTERPOLATION IN HORIZONTAL DIRECTION WHEN SUBJECT IS HORIZONTAL LINE
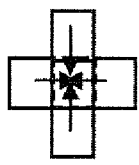
Fig. 5C — INTERPOLATION IN VERTICAL AND HORIZONTAL DIRECTIONS WHEN SUBJECT IS NOT VERTICAL AND HORIZONTAL LINES

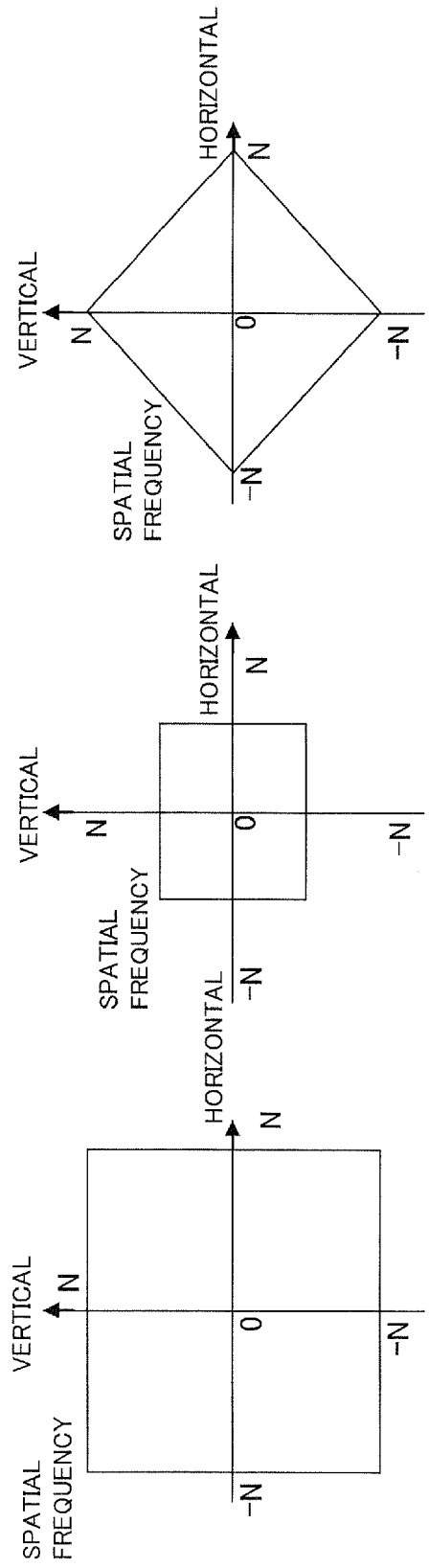

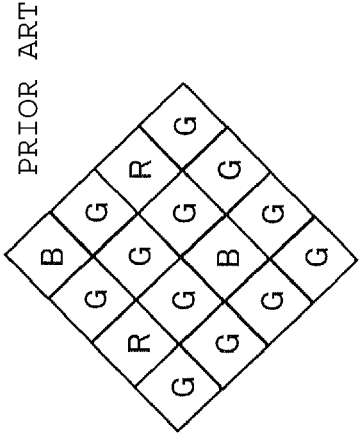

IMAGING APPARATUS AND IMAGE PROCESSING PROGRAM

BACKGROUND ART

1. Technical Field

The technical field relates to an imaging apparatus such as a digital still camera, and in particular, to an imaging apparatus capable of recording, in a recording medium, RAW data which is created based on image data generated by an imaging device.

2. Related Art

In digital imaging apparatuses using a layer imaging device, such as digital still cameras, any one of a plurality of kinds of color filters is arranged on a front side (on a subject side) of each of pixels constituting the imaging device.

FIGS. 8A to 8E show color arrangement patterns of color filters. R represents a red color filter, G represents a green color filter, and B represents a blue color filter. FIG. 8A shows a color arrangement pattern of color filters so-called "Bayer array" in which G color filters are staggered and R and B color filters are interlaid in positions where G color filters are not present. FIG. 8B shows a color arrangement pattern of color filters in which G color filters are arranged in stripes and R and B color filters are interlaid in columns where G color filters are not present. FIG. 8C shows a color arrangement pattern of color filters in which G color filters are arranged in a honeycomb pattern so as to surround R and B color filters.

While FIGS. 8A to 8C show color arrangement patterns of primary color filters, as shown in FIGS. 8D and 8E, various color arrangement patterns of complementary color filters have also been proposed. In FIGS. 8D and 8E, C presents a cyan color filter, Y represents a yellow color filter, M represents a magenta color filter, and G represents a green color filter. Primary color filters are used as color filters in the description below.

The image data outputted from the imaging device having the color filters arranged on the front side are generally referred to as "RAW data". The RAW data are image data having a configuration that corresponds to the pixel positions of the pixels constituting the imaging device. Accordingly, in the case of the primary color filters, only pixel data of a color that corresponds to any of the R, G, and B color filters are present in the pixel positions of the pixels.

Thus, at each pixel position, pixel data (pixel value) of a color corresponding to a color filter that is not disposed in the pixel is obtained by interpolating the pixel data (pixel values) of the peripheral pixels. For example, the image data of colors corresponding to red and blue are interpolated from the image data of the peripheral pixels on which R and B color filters are disposed ("R and B color filters-disposed-peripheral pixels") into the image data of the pixels on which G color filters are disposed ("G color filter-disposed-pixels"). In this manner, image data corresponding to all red, green, and blue colors are obtained at the respective pixel positions of the pixels.

Japanese Patent No. 3862506 discloses a technique of interpolating pixel data of a color corresponding to a color filter that is not disposed on a pixel from the pixel data of the peripheral pixels, as described above.

Recently, with the remarkable growth in capacity of data-recording media for digital imaging apparatuses such as digital still cameras, there is an increasing demand to record not only JPEG data but also RAW data in the recording media. Recording RAW data enables various processes that are not possible with JPEG data to be repeatedly performed by using image processing software loaded on personal computers. The image processing software is generally referred to as "developing software".

In recording JPEG data, Y/C separation is performed on the image data obtained by interpolating the image data of a color corresponding to color filters that are not disposed in certain pixels from the image data of the peripheral pixels, so as to create Y/C data. Then, various correction processes are performed on the Y/C data, and the resultant data are compressed in JPEG format to create JPEG data.

Meanwhile, in recording RAW data also, the user may want to perform correction on the RAW data before recording it. For example, it is difficult to correct aberration, such as distortion that exists inevitably in imaging optical systems, with image processing software. Thus, it is desired that correction of distortion and the like is performed before recording the data from the imaging device as RAW data. Such correction is performed through partial enlargement/reduction of image data, but the RAW data generally contains pixel data of one color per pixel position. Consequently, in the form of RAW data, it is not possible to perform partial enlargement/reduction of image data for correction of distortion and the like in the conventional art.

Further, in a case where, in performing image processing with developing software, RAW data of a large size are not necessary and only RAW data of a small size suffice, if reduced RAW data can be recorded, it becomes possible to increase the number of RAW data that can be recorded in the recording medium as well as to cut the processing time required for recording the RAW data.

SUMMARY

An object is to provide an imaging apparatus capable of creating RAW data subsequently to predetermined processing including distortion correction and reduction/enlargement processing of an image.

In a first embodiment, An imaging apparatus is provided, including: an imaging device operable to convert an optical signal to an electrical signal to create image data in a first color arrangement pattern; a color arrangement conversion unit operable to convert a color arrangement pattern of the image data from the first color arrangement pattern to a second color arrangement pattern; an image processing unit operable to perform predetermined processing on the image data converted to the second color arrangement pattern by the color arrangement conversion unit; and a color arrangement reverse-conversion unit operable to convert reversely the color arrangement pattern of the image data subjected to the predetermined processing by the image processing unit from the second color arrangement pattern back to the first color arrangement pattern.

In a second aspect, a computer-readable recording medium is provided, storing an image processing program. The image processing program causes a computer to function as: an image data input unit operable to input image data in a first color arrangement pattern; a color arrangement conversion unit operable to convert a color arrangement pattern of the image data from the first color arrangement pattern to a second color arrangement pattern; an image processing unit operable to perform predetermined processing on the image data converted to the second color arrangement pattern by the color arrangement conversion unit; and a color arrangement reverse-conversion unit operable to convert reversely the color arrangement pattern of the image data subjected to the predetermined processing by the image processing unit from the second color arrangement pattern back to the first color arrangement pattern.

In a third aspect, an imaging method is provided, which includes: converting an optical signal obtaining from an imaging device to an electrical signal to create image data in a first color arrangement pattern; converting a color arrangement pattern of the image data from the first color arrangement pattern to a second color arrangement pattern; performing predetermined processing on the image data converted to the second color arrangement pattern; and converting reversely the color arrangement pattern of the image data subjected to the predetermined processing from the second color arrangement pattern back to the first color arrangement pattern.

According to the above configurations, the color arrangement pattern (a first color arrangement pattern) of image data from an imaging device is converted into a different color arrangement pattern (a second color arrangement pattern), predetermined processing such as distortion correction, reduction, or enlargement is performed on the converted image data, and the image data obtained after the predetermined processing are converted from the second color arrangement pattern again to the first color arrangement pattern. Thus, it is possible to create RAW data after performing predetermined processing such as distortion correction or image reduction/enlargement processing.

BRIEF DESCRIPTION OF DRAWINGS

FIG. 3 is a flowchart of an operation of recording RAW data.

FIGS. 4A, 4B, 4C, 4D, 4E, 4F, 4G, 4H, and 4I are conceptual diagrams illustrating a flow of color arrangement conversion processing at a color arrangement conversion/reverse-conversion unit, image processing at an image processing unit, and color arrangement reverse-conversion processing at the color arrangement conversion/reverse-conversion unit.

FIGS. 5A, 5B and 5C are conceptual diagrams illustrating processing of interpolating pixel data of green.

FIGS. 7A, 7B and 7C are conceptual diagrams showing change in resolution according to densities of pixels.

FIGS. 8A, 8B and 8C show color arrangement patterns of primary color filters, and FIGS. 8D and 8E show color arrangement patterns of complementary color filters.

DETAIL DESCRIPTION OF THE PREFERRED EMBODIMENTS

An Embodiment is described below with reference to the accompanying drawings.

1 Configuration of Digital Still Camera

Figure 1:
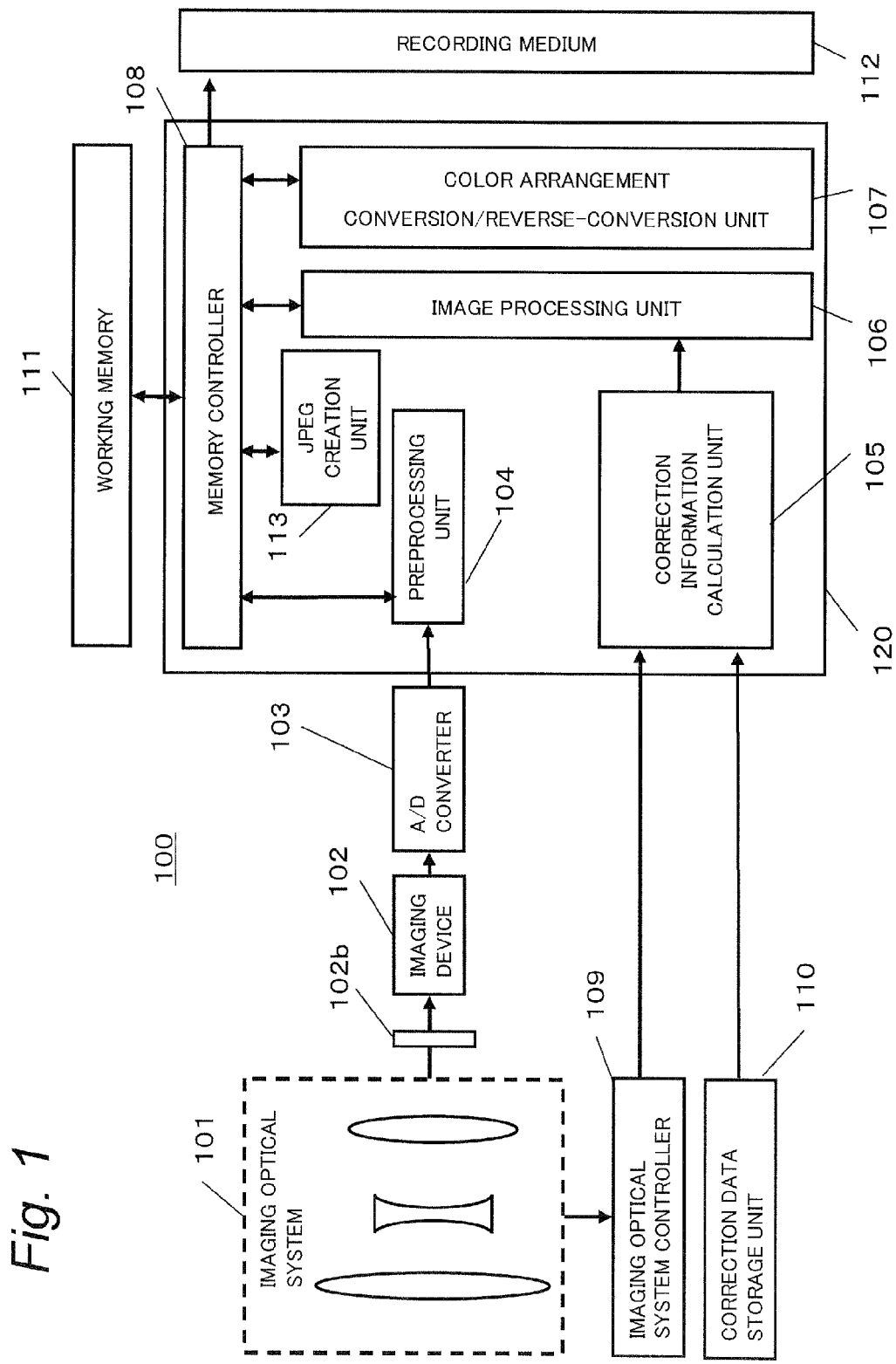
FIG. 1 is a block diagram showing a configuration of a digital still camera serving as one embodiment of an imaging apparatus of an embodiment.

FIG. 1 shows a block diagram showing a configuration of a digital still camera which is one embodiment of an imaging apparatus. A digital still camera 100 of the present embodiment is capable of recording captured image data as JPEG data and also as RAW data. The JPEG data and RAW data are recorded in a removable recording medium 112 such as a memory card.

The digital still camera 100 includes an imaging optical system 101, an imaging optical system controller 109 that controls the operation of the imaging optical system 101, an imaging device 102 that converts optical signals obtained through the imaging optical system 101 to electrical signals, an A/D converter 103 that converts analog signals from the imaging device 102 to digital signals, and an image processing LSI (Large-Scale Integration) 120 that is capable of creating image data by applying predetermined processing to the digital signals from the A/D converter 103 and recording the resultant data in the recording medium 112. The digital still camera 100 further includes a working memory 111 that is used by the image processing LSI 120 as a working area, and a correction data storage unit 110 that stores information required for image correction.

The image processing LSI 120 includes a preprocessing unit 104 that performs preprocessing, a JPEG creation unit 113 that creates JPEG data, a correction information calculation unit 105 that creates correction data, an image processing unit 106 that performs predetermined image processing, and a color arrangement conversion/reverse-conversion unit 107 that executes processing including color arrangement conversion of an image.

The imaging device 102 is a photoelectric conversion device that has a plurality of pixels arranged on a light receiving surface to convert an image formed on the light receiving surface by the imaging optical system 101 to electrical signals per pixel. For example, a CCD image sensor and a CMOS image sensor are widely applicable to the imaging device 102.

The photoelectric conversion devices such as a CCD image sensor and a CMOS image sensor have high sensitivity in infrared regions. For this reason, an infrared removing unit such as an infrared cut glass or an infrared cut filter is generally attached to the front surface of a photoelectric conversion device, so as to simulate the sensitivity characteristics of human eyes by preventing infrared light from entering the photoelectric conversion device. In FIG. 1, the infrared removing unit is omitted.

Color filters 102b of any color of red, green, and blue are arranged on the front sides of all the pixels constituting the imaging device 102. The color filters 102b are arranged in a regular pattern, e.g., as shown in the Bayer array of FIG. 8A. The arrangement pattern of the color filters 102b that are arranged on the front sides of all the pixels constituting the imaging device 102 is a first color arrangement pattern, and the Bayer array is one of the examples. The color filters 102b may be complementary color filters.

The light that has entered through the imaging optical system 101 is collected into an image on the imaging device 102 through the infrared removing unit and the respective color filters 102b of red, green, and blue, and the image is converted to image data corresponding to the intensities of red, green, and blue light rays.

The preprocessing unit 104 writes, into the working memory 111 under the control of a memory controller 108, image data generated by converting image data outputted from the imaging device 102 into digital values by the A/D converter 103.

The preprocessing unit 104 then reads the image data sequentially from the working memory 111 under the control of the memory controller 108 to perform preprocessing including gain adjustment and gamma correction on the image data. The preprocessed image data are written again into the working memory 111 under the control of the memory controller 108.

The correction data storage unit 110 stores information required for predetermined processing that is performed on the image data outputted from the imaging device 102. The processing includes, for example, correction of distortion aberrations in each of red, green, and blue corresponding to the focal distance of the imaging optical system 101 and the height of the image, correction of chromatic aberration (i.e., correction based on optical characteristics of the optical system), or image enlargement/reduction processing.

Figure 2B:
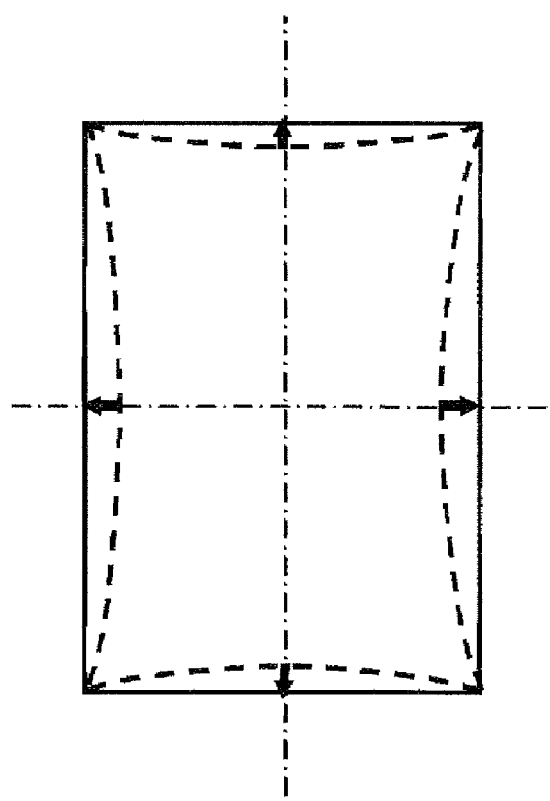
FIGS. 2A and 2B are conceptual diagrams illustrating distortion aberrations.
Figure 2A:
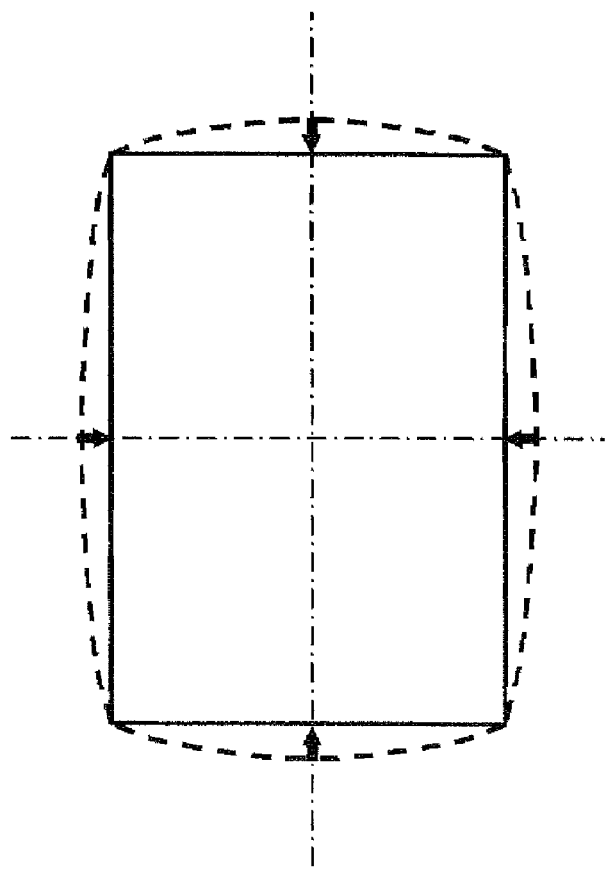

The distortion aberration and chromatic aberration will be described. The distortion aberration is an image distortion that occurs in the edge portion of an optical system. FIGS. 2A and 2B are conceptual diagrams illustrating distortion aberrations. Both FIGS. 2A and 2B show the original shape of a subject in the form of the rectangles drawn with solid lines and the shape of the subject of the image actually formed on the imaging device 102 in the form of the graphic forms drawn with dashed lines. FIG. 2A shows a phenomenon generally called a barreled distortion, and FIG. 2B shows a phenomenon generally called a spool distortion. Although the distortion aberrations should be removed as much as possible by appropriately designing the imaging optical system 101, in order to strike a balance between the size and price of the imaging optical system 101, distortion aberrations are tolerated to a certain degree. The distortion aberrations that cannot be removed in the imaging optical system 101 may be corrected through image processing. The arrows in FIGS. 2A and 2B denote the concept of correction of distortion aberrations.

The chromatic aberration means color blur that occurs due to the fact that indices of refraction of light rays vary according to the wavelengths. Although the chromatic aberration is also desirably removed in the imaging optical system 101 like the distortion aberrations, the chromatic aberration can be corrected through image processing. If the chromatic aberration is corrected through image processing, the positions of pixel data may be moved by each of the pixels corresponding to the R, G, and B color filters.

The JPEG creation unit 113 creates JPEG data from the image data that have been preprocessed and written in the working memory 111 to record the resultant JPEG data into the recording medium 112.

The image processing unit 106 performs predetermined processing on the image data that have been preprocessed and written in the working memory 111 to create RAW data, and records the created RAW data into the recording medium 112. At this time, the image processing unit 106 may refer to correction data from the correction data storage unit 110 to execute the predetermined processing on the preprocessed image data.

2 Operation of Digital Still Camera
2.1 Recording of JPEG Data

First, the operation of the digital still camera 100 for the case of recording JPEG data will be described. The JPEG creation unit 113 reads the preprocessed image data sequentially from the working memory 111 under the control of the memory controller 108. The JPEG creation unit 113 interpolates, for each pixel, pixel data of a color of a color filter that is not disposed in that pixel, from the pixel data of the peripheral pixels. For example, since the R and B color filters are not disposed in the pixel to which the G color filter is disposed, the pixel data of red or blue for the G color filter-disposed-pixel is interpolated from the pixel data of—peripheral R or B color filter-disposed pixel. In this manner, all the pixels come to have pixel data of colors of red, green, and blue. The JPEG creation unit 113 performs Y/C separation on the image data having the pixel data of red, green, and blue to create Y/C data. Further, after performing various kinds of correction processing on the Y/C data, the JPEG creation unit 113 compresses the resultant data into JPEG format to create JPEG data. The JPEG data thus created are recorded in the recording medium 112 under the control of the memory controller 108.

2.2 Recording of Raw Data

The operation of the digital still camera 100 for the case of recording RAW data will be described. In the present embodiment, the image data having a first color arrangement pattern created by the imaging device 102 are converted to a second color arrangement pattern, and predetermined processing is performed on the image data in the second color arrangement pattern. Subsequently, the predetermined-processed image data in the second color arrangement pattern are converted to image data in the first color arrangement pattern. The image data in the first color arrangement pattern thus obtained through the predetermined processing are recorded in the recording medium 112 as RAW data.

Specifically, the color arrangement conversion/reverse-conversion unit 107 reads the preprocessed image data sequentially from the working memory 111 under the control of the memory controller 108 to convert the color arrangement pattern (the first color arrangement pattern) of the image data to another color arrangement pattern (the second color arrangement pattern).

Then, the image processing unit 106 performs predetermined processing on the image data in the second color arrangement pattern. The color arrangement conversion/reverse-conversion unit 107 performs reverse-conversion on the image data having the second color arrangement pattern that have been performed the predetermined processing, again to the first color arrangement pattern, and records the resultant image data in the first color arrangement pattern into the recording medium 112 as RAW data.

Referring to FIG. 3 and FIGS. 4A to 4I, description is given to a flow of the color arrangement conversion processing at the color arrangement conversion/reverse-conversion unit 107, the image processing at the image processing unit 106, and the color arrangement reverse-conversion processing at the color arrangement conversion/reverse-conversion unit 107. FIGS. 4A to 4I illustrate conversion processing of a color arrangement pattern for a case of performing image enlargement processing as the predetermined processing to be executed by the image processing unit 106.

After the preprocessing, the image data captured with the imaging device 102 are stored in the working memory 111. The color arrangement conversion/reverse-conversion unit 107 reads the preprocessed image data from the working memory 111 (S11). FIG. 4A shows preprocessed image data read from the working memory 111, and the image data have the Bayer array (the first color arrangement pattern). Subsequently, the color arrangement conversion/reverse-conversion unit 107 separates and extracts, from the image data as shown in FIG. 4A, respective pixel data for each of green, red, and blue colors at pixel positions on which the C, R, and B color filters are disposed respectively (S12). FIG. 4B shows pixel data at pixel positions on which the G color filters are disposed, extracted from the image data in the first color arrangement pattern shown in FIG. 4A. Similarly, FIGS. 4C and 4D show pixel data at pixel positions on which the R and B color filters are disposed, respectively, extracted from the image data in the first color arrangement pattern shown in FIG. 4A.

Then, with respect to pixel data of green color (see FIG. 4B), the color arrangement conversion/reverse-conversion unit 107 obtains pixel data (pixel values) of green color at the pixel position on which the G color filter is not disposed, i.e., at the pixel position on which the R or B color filter is disposed, by interpolation with the values of the peripheral pixels (S13). Specifically, image data which have pixel data (pixel values) of green color in all the pixel positions are obtained. Human eyes have high sensitivity to green color (G), and therefore resolution is enhanced for green color (G). FIG. 4E shows image data obtained in this manner, having pixel values of green color in all the pixel positions. In the present example, the light intensity signal specific to each pixel is referred to as "pixel data". The image data is generated from a plurality pieces of pixel data.

Next, the image processing unit 106 performs predetermined processing on the image data of each color shown in FIGS. 4E, 4C, and 4D (S14). In the present example, enlargement (zooming up) processing is executed as the predetermined processing. More specifically, the image processing unit 106 inputs correction data for the enlargement processing from the correction information calculation unit 105, performs, based on the correction data, enlargement processing on the image data of each color shown in FIGS. 4E, 4C, and 4D, and obtains the image data as shown in FIGS. 4F, 4G, and 4H as a result.

Then, the color arrangement conversion/reverse-conversion unit 107 arranges the data having each of green, red, and blue colors shown in FIGS. 4F, 4G, and 4H into the Bayer array (the first color arrangement pattern) to create image data as shown in FIG. 4I and writes the created image data back into the working memory 111 under the control of the memory controller 108 (S15).

The color arrangement combining the image data shown in FIGS. 4C, 4D, and 4E is an example of the second color arrangement pattern. As described above, in the present embodiment, the image data of red, green, and blue colors having the second color arrangement pattern are created from the image data having the first color arrangement pattern that have been created by the imaging device 102. Then, particularly of green image data, the pixel values are obtained for all the pixels. After that, the predetermined processing is performed for the image data having the second color arrangement pattern, and the data obtained through the predetermined processing are arranged into one kind of image data employing the first color arrangement pattern (i.e., the Bayer array).

FIG. 4I shows image data reversely converted into the first color arrangement pattern, i.e., the Bayer array. The reverse-conversion is carried out by embedding the pixel data of FIG. 4G into the positions to be occupied by the red pixel data shown in FIG. 4F and by embedding the pixel data of FIG. 4H into the positions to be occupied by the blue pixel data shown in FIG. 4F. The image data created through reverse-conversion and arranged in the Bayer array are recorded into the removable recording medium 112 as RAW data by the image processing unit 106 under the control of the memory controller 108 (S16).

2.2.1 Processing of Interpolating Pixel Data of Green Color

The processing of interpolating pixel data of green color performed by the color arrangement conversion/reverse-conversion unit 107 in order to obtain the image data shown in FIG. 4E from the image data shown in FIG. 4B will be described with reference to FIGS. 5A to 5C.

In the case where a correlation of pixel data is recognized between pixels in a vertical direction of a R or B color filter-disposed-pixel, as shown in FIG. 5A, pixel data of green is interpolated in the pixel position of the R or B color filter-disposed-pixel based on the pixel data of the G color filter-disposed-pixel vertical to the R or B color filter-disposed-pixel. In the case where a correlation of pixel data of a pixel is recognized in a horizontal direction of a pixel position of an R or B color filter-disposed-pixel, as shown in FIG. 5B, pixel data of green is interpolated in the pixel position of the R or B color filter-disposed-pixel based on the pixel data of the G color filter-disposed-pixels horizontal to the R or B color filter-disposed-pixel. In the case where no correlation of pixel data of G color filter-disposed-pixels either vertically or horizontally to a pixel position of an R or B color filter-disposed-pixel is recognized, as shown in FIG. 5C, pixel data of green is interpolated in the pixel position of the R or B color filter-disposed-pixel based on the pixel data of the G color filter-disposed-pixels both vertical and horizontal to the R or B color filter-disposed-pixel.

Figure 6:
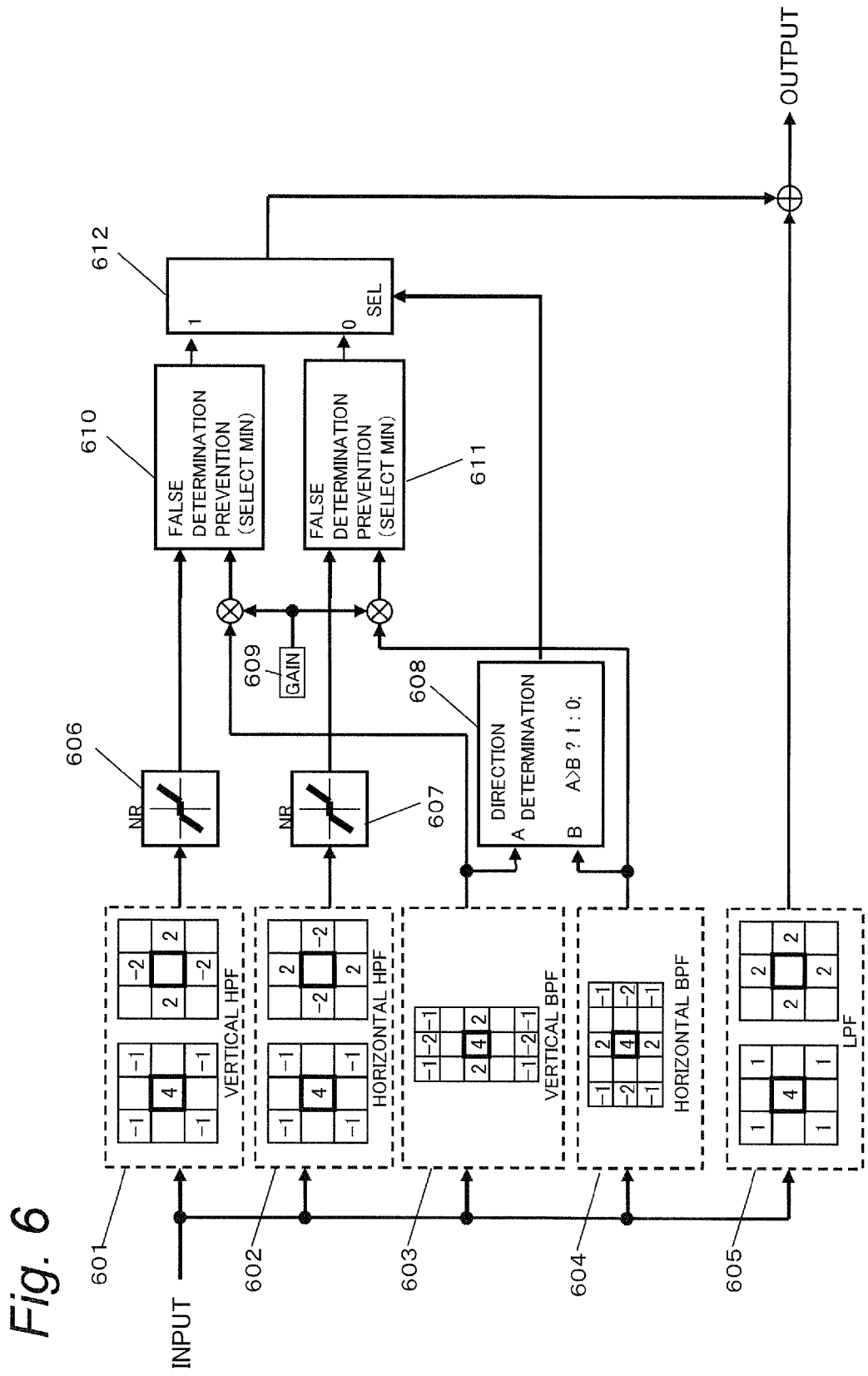
FIG. 6 shows an example of an interpolation circuit for green pixel data.

FIG. 6 shows an exemplary configuration of a pixel data interpolation circuit included in the color arrangement conversion/reverse-conversion unit 107. The pixel data is inputted sequentially into the interpolation circuit. A direction determination circuit 608 outputs a direction determination signal to a selector 612 based on the output of a vertical band-pass filter 603 and the output of a horizontal band-pass filter 604. Larger output from the vertical band-pass filter 603 indicates a correlation in a vertical direction, and larger output from the horizontal band-pass filter 604 indicates a correlation in a horizontal direction.

The output from a vertical high-pass filter 601 and the output from a horizontal high-pass filter 602 are reduced noise by NR circuits 606 and 607, respectively, and are then inputted to false determination prevention circuits 610 and 611. The false determination prevention circuit 610 compares the output obtained through the noise reduction at the NR circuit 606 from the vertical high-pass filter 601 with the output from the vertical band-pass filter 603, to give the output having a smaller absolute value to the selector 612. The other false determination prevention circuit 611 likewise compares the output obtained through noise removal at the NR circuit 607 from the horizontal high-pass filter 602 with the output from the horizontal band-pass filter 604, to give the output having a smaller absolute value to the selector 612. This is because the reliability of a correlation is considered to be low when the output from the vertical band-pass filter 603 or the horizontal band-pass filter 604 does not have a sufficiently large value compared with the output from the vertical high-pass filter 601 or the horizontal high-pass filter 602. In order to conduct the comparison appropriately, a gain control circuit 609 is provided on the output side of the vertical band-pass filter 603 and the horizontal band-pass filter 604.

Through this configuration, even when the direction determination circuit 608 outputs a direction determination signal indicating either a vertical or horizontal direction to the selector 612, if the reliability of the correlation is low, the smaller output from the vertical band-pass filter 603 or the horizontal band-pass filter 604 is selected, rather than the output from the vertical high-pass filter 601 or the horizontal high-pass filter 602. The pixel data outputted from the selector 612 are added to the output from a low-pass filter 605 to be output.

In this manner, image data as shown in FIG. 4E are obtained in which green pixel data are interpolated in pixel positions at which the R and B color filters are disposed.

FIGS. 7A to 7C illustrate change in resolution according to densities of pixels. In FIGS. 7A to 7C, the diagrams on the upper side are conceptual diagrams showing the densities of pixels, and the diagrams on the lower side are graphs showing the distributions of spatial frequencies. FIG. 7A shows a state in which pixel data are present at all pixel positions. FIG. 7B shows a state in which pixel data are present in a pattern like R and B color filters in the Bayer array. In FIG. 7B, the spatial frequencies are ½ of those shown in FIG. 7A in both the horizontal and vertical directions. FIG. 7C shows a state in which pixel data are present like G color filters in the Bayer array. In FIG. 7C, the spatial frequencies in the diagonal direction are ½ of those shown in FIG. 7A. In a case where enlargement/reduction processing or the like is to be performed on RAW data, it is desired that processing is performed separately for each of the colors so as to obviate adverse effect on color reproducibility and the like. If, however, interpolation processing for enlargement/reduction is performed on the signals of which the spatial frequencies are limited low in the horizontal, vertical, or diagonal direction as mentioned above, there is caused serious degradation in resolution by the arithmetic operation for the interpolation processing. Accordingly, regarding green, the pixel data are interpolated with reference to the correlation with the peripheral pixels and the resolution is enhanced, so as to be followed by the enlargement/reduction zooming processing.

2.2.2 Another Example of Predetermined Processing (Distortion Correction, Reduction Processing)

In the example shown in FIGS. 4A to 4I, image enlargement processing is executed as the predetermined processing performed by the image processing unit 106, but the predetermined processing is not limited thereto. As the predetermined processing, correction may be made on aberrations including distortion aberrations and chromatic aberration. The correction of aberration is carried out by partially enlarging/reducing image data.

As the predetermined processing, for making correction on aberration such as distortion aberrations, the amount of movement of each pixel relative to the pixel position is calculated based on correction data transmitted from the correction information calculation unit 105.

Specifically, at the time of image photographing, the imaging optical system controller 109 transmits, to the correction information calculation unit 105, information relating to the imaging optical system 101 used in photographing, including, e.g., a focal distance, diaphragm value, and distance to the subject.

The correction data storage unit 110 includes information for correcting the image data captured by the imaging device 102. The correction information calculation unit 105 extracts correction data corresponding to the information used in photographing of the imaging optical system 101 from the correction data storage unit 110. The correction data contains, e.g., amounts of correction of distortion aberrations for each of red, green, and blue in association with the focal distance of the imaging optical system 101 and the height of the image and amounts of correction of chromatic aberration. In other words, the correction data can be obtained through, e.g., optical simulation using the design data of the imaging optical system 101. In the case where the correction data storage unit 110 does not store correction data corresponding to the information used in photographing of the imaging optical system 101, correction data used in photographing is calculated by obtaining correction data by means of interpolation of known data. The correction information calculation unit 105 transmits the correction data extracted or calculated, to the image processing unit 106.

The image processing unit 106 performs correction of aberration on the image data shown in FIGS. 4E, 4C, and 4D based on the correction data transmitted from the correction information calculation unit 105 and writes the corrected image data having the second color arrangement pattern into the working memory 111. After that, the color arrangement conversion/reverse-conversion unit 107 reads the image data sequentially from the working memory 111 to convert reversely the color arrangement pattern from the second color arrangement pattern to the first color arrangement pattern.

As the predetermined processing, it is also conceivable to perform simple reduction processing for reducing the size of RAW data. The image processing unit 106 writes the predetermined-processed image data having the second color arrangement pattern into the working memory 111. Then, the color arrangement conversion/reverse-conversion unit 107 reads the image data sequentially from the working memory 111 to perform reverse-conversion of the color arrangement pattern from the second color arrangement pattern to the first color arrangement pattern.

The image processing unit 106 may also perform, as the predetermined processing, a plurality of kinds of processing in combination on the image data shown in FIGS. 4E, 4C, and 4D. For example, image enlargement processing shown in FIGS. 4A to 4I and aberration correction processing may be executed simultaneously.

3 Others

In the configuration described above, while the preprocessing unit 104, the correction information calculation unit 105, the image processing unit 106, the color arrangement conversion/reverse-conversion unit 107, and the memory controller 108 are provided in a single LSI 120, the present embodiment is not limited to this configuration. Further, although the color arrangement conversion/reverse-conversion unit 107 is configured integrally in the present example, the unit may obviously be configured into discrete circuits.

The functions of the digital still camera described above may be applied to image processing programs on computers. In this case, the correction data needs to be inputted from the outside.

INDUSTRIAL APPLICABILITY

According to the present embodiment, the color arrangement pattern of the image data from the imaging device is converted to a color arrangement pattern (the second color arrangement pattern) that is different from the aforementioned color arrangement pattern (the first color arrangement pattern). The converted image data is processed with predetermined processing such as distortion correction, reduction, and enlargement, and the image data obtained through the predetermined processing are subjected to conversion from the second color arrangement pattern again to the first color arrangement pattern. It is thereby possible to create RAW data that have been processed with the predetermined processing including distortion correction and image reduction/enlargement processing. Hence, the present embodiment is applicable to imaging apparatuses, such as digital still cameras, capable of recording image data captured using imaging devices, and also to image processing programs.

What is claimed is:

1. An imaging apparatus comprising:
an imaging device operable to convert an optical signal to an electrical signal to create image data in a first color arrangement pattern;
a color arrangement conversion unit operable to convert a color arrangement pattern of the image data from the first color arrangement pattern to a second color arrangement pattern;
an image processing unit operable to perform predetermined processing on the image data converted to the second color arrangement pattern by the color arrangement conversion unit; and
a color arrangement reverse-conversion unit operable to convert reversely the color arrangement pattern of the image data subjected to the predetermined processing by the image processing unit from the second color arrangement pattern back to the first color arrangement pattern.

2. The imaging apparatus according to claim 1, further comprising:
color filters that include a plurality of colors and are arranged on a front surface of the imaging device,
wherein the first color arrangement pattern is a pattern of an array of colors of the color filters.

3. The imaging apparatus according to claim 2, wherein the color arrangement conversion unit when converting the color arrangement pattern of the image data from the first color arrangement pattern to the second color arrangement pattern obtains, through an interpolation process, pixel values of a predetermined color for pixels on which the color filters of colors other than the predetermined color are disposed, such that pixel values of the predetermined color are obtained in all the pixels of the image data.

4. The imaging apparatus according to claim 3, wherein the predetermined color is green.

5. The imaging apparatus according to claim 1, further comprising:
a correction information unit operable to output correction information for the image data in the first color arrangement pattern, wherein
the image processing unit performs the predetermined processing on the image data converted by the color arrangement conversion unit based on the correction information.

6. The imaging apparatus according to claim 5, wherein the predetermined processing includes an alteration of a pixel position.

7. The imaging apparatus according to claim 5, wherein the predetermined processing includes correcting at least one of a distortion aberration or a chromatic aberration included in the image data in the first color arrangement pattern.

8. The imaging apparatus according to claim 1, further comprising:
a recording unit operable to record, in a recording medium, the image data having the color arrangement pattern which is converted reversely from the second color arrangement pattern back to the first color arrangement pattern by the color arrangement reverse-conversion unit.

9. A non-transitory computer-readable recording medium storing an image processing program that causes a computer to function as:
an image data input unit operable to input image data in a first color arrangement pattern;
a color arrangement conversion unit operable to convert a color arrangement pattern of the image data from the first color arrangement pattern to a second color arrangement pattern;
an image processing unit operable to perform predetermined processing on the image data converted to the second color arrangement pattern by the color arrangement conversion unit; and
a color arrangement reverse-conversion unit operable to convert reversely the color arrangement pattern of the image data subjected to the predetermined processing by the image processing unit from the second color arrangement pattern back to the first color arrangement pattern.

10. The non-transitory computer-readable recording medium according to claim 9, wherein
the image data is generated by an imaging device,
color filters including a plurality of colors are arranged on a front surface of the imaging device, and
the first color arrangement pattern is a pattern of an array of colors of the color filters.

11. The non-transitory computer-readable recording medium according to claim 10, wherein
the color arrangement conversion unit when converting the color arrangement pattern of the image data from the first color arrangement pattern to the second color arrangement pattern obtains, through an interpolation processing, pixel values of a predetermined color for pixels on which the color filters of colors other than the predetermined color are disposed, such that pixel values of the predetermined color are obtained in all the pixels of the image data.

12. The non-transitory computer-readable recording medium according to claim 11, wherein the predetermined color is green.

13. The non-transitory computer-readable recording medium according to claim 10, wherein the image processing program further causes the computer to function as a correction information unit operable to output correction information for the image data in the first color arrangement pattern, and
the image processing unit performs the predetermined processing on the image data converted by the color arrangement conversion unit based on the correction information.

14. The non-transitory computer-readable recording medium according to claim 13, wherein
the predetermined processing is processing includes an alteration of a pixel position.

15. The non-transitory computer-readable recording medium according to claim 13, wherein
the predetermined processing includes correcting at least one of a distortion aberration or a chromatic aberration included in the image data in the first color arrangement pattern.

16. The non-transitory computer-readable recording medium according to claim 9, wherein
the image processing program further causes the computer to function a recording unit operable to record, in a recording medium, the image data having the color arrangement pattern which is converted reversely from the second color arrangement pattern back to the first color arrangement pattern by the color arrangement reverse-conversion unit.

17. An imaging method comprising:
converting an optical signal obtaining from an imaging device to an electrical signal to create image data in a first color arrangement pattern;
converting a color arrangement pattern of the image data from the first color arrangement pattern to a second color arrangement pattern;
performing predetermined processing on the image data converted to the second color arrangement pattern; and
converting reversely the color arrangement pattern of the image data subjected to the predetermined processing from the second color arrangement pattern back to the first color arrangement pattern.

18. The imaging method according to claim 17, further comprising:
arranging color filters that include a plurality of colors on a front surface of the imaging device, wherein the first color arrangement pattern is a pattern of an array of colors of the color filters.

19. The imaging method according to claim 18, further comprising:

when converting the color arrangement pattern of the image data from the first color arrangement pattern to the second color arrangement pattern, obtaining, through an interpolation process, pixel values of a predetermined color for pixels on which the color filters of colors other than the predetermined color are disposed, such that pixel values of the predetermined color are obtained in all the pixels of the image data.

20. The imaging method according to claim 17, wherein the predetermined processing includes correcting at least one of a distortion aberration or a chromatic aberration included in the image data in the first color arrangement pattern.

* * * * *